United States Patent [19]

Gyugyi

[11] 4,352,156
[45] Sep. 28, 1982

[54] AC TO AC POWER CONVERTER WITH A CONTROLLABLE POWER FACTOR

[75] Inventor: Laszlo Gyugyi, Penn Hills, Pa.

[73] Assignee: Westinghouse Electric Corp., Pittsburgh, Pa.

[21] Appl. No.: 293,045

[22] Filed: Aug. 14, 1981

[51] Int. Cl.³ .............................................. H02M 5/22
[52] U.S. Cl. ..................................... 363/163; 323/207
[58] Field of Search ...................... 363/34, 36, 37, 159, 363/160, 161, 162, 163, 164, 165; 323/205, 207

[56] References Cited

U.S. PATENT DOCUMENTS

| | | | |
|---|---|---|---|
| 3,419,785 | 12/1968 | Lafuze | 363/161 X |
| 3,493,838 | 2/1970 | Gyugyi et al. | 363/160 X |
| 3,707,665 | 12/1972 | Gyugyi | 363/163 |
| 3,707,666 | 12/1972 | Gyugyi | 363/163 |
| 3,707,667 | 12/1972 | Gyugyi | 363/163 |
| 3,959,719 | 5/1976 | Espelage | 363/161 X |

Primary Examiner—William M. Shoop
Assistant Examiner—Peter S. Wong
Attorney, Agent, or Firm—G. H. Telfer

[57] ABSTRACT

The input power factor of an AC to AC static power converter is continuously adjustable between a maximum leading or lagging phase angle, determined by the load power factor, through rapidly transferring between conventional and complementary unrestricted frequency changer operation with the proportion of each sub generator cycle interval dedicated to each mode of operation being selected to produce the desired input power factor. Since the input power factor affects generator excitation, the input power factor control can be used in a closed loop feedback control system to regulate generator voltage.

14 Claims, 23 Drawing Figures

AC TO AC POWER CONVERTER WITH A CONTROLLABLE POWER FACTOR

CROSS-REFERENCE TO RELATED APPLICATION

My concurrently filed, commonly owned, U.S. Patent application entitled "Variable Speed Constant Frequency Power Converter With Two Modes Of Operation" identified as Ser. No. 292,975.

BACKGROUND OF THE INVENTION

1. Field of the Invention

This invention relates to methods and apparatus for generating an AC output waveform of one frequency from a multiphase AC input waveform of another frequency and more particularly for controlling the input power factor in such a power conversion.

2. Description of the Prior Art

Solid state frequency changers synthesize an output waveform of one frequency from a multiphase input waveform of another frequency by sequentially switching segments of each phase of the input waveform to the output. In some such frequency changers an output waveform of constant frequency is generated from an input waveform of variable frequency. These units are referred to as variable-speed-constant-frequency (VSCF) power converters. A practical application of such a frequency changer is an aircraft electrical system wherein fixed frequency power is derived from an AC generator driven at variable speed by the aircraft engine.

My copending application referred to above discloses a VSCF power converter which is operated as an unrestricted frequency changer (UFC) at low generator frequencies and is operated in a complementary mode at high frequencies. Under UFC operation, the frequency changer sequentially switches to input phases which are more positive when the fundamental component of the output waveform is positive going and to input phases which are more negative when the output fundamental is negative going. The switching pattern is reversed under complementary UFC (CUFC) operation; that is, switching is to input phases which are more negative when the output waveform fundamental component is positive going and to input phases which are more positive when it is negative going. Since the switching frequency is lower in the complementary mode of operation which is used at the higher generator frequencies, the switching frequency over the entire range of generator frequencies does not vary widely. This increases the efficiency of the frequency changer and permits the use of slower solid state switching devices than would otherwise be required.

Another feature of the frequency changer disclosed in my copending application is that under UFC operation the frequency changer inverts the load phase angle. Thus, since the load in aircraft electric power systems is normally inductive producing a lagging load power factor, the generator sees a leading power factor. This leading input power factor aids in the excitation of the generator and is the reason that UFC operation is used at low generator frequencies. On the other hand, the CUFC mode of operation results in an input power factor that is the same as the load power factor. This lagging input power factor reduces the generator terminal voltage at high generator frequencies where this mode of operation is used.

While the phase angle of input power factor of the frequency changer of my copending application can be inverted, the magnitude of the phase angle is dictated by the load power factor.

It is the primary object of the present invention to provide an AC to AC power converter in which the magnitude as well as the character of the input power factor can be controlled. It is also an object of the invention to provide a novel means for controlling the voltage of a generator driven at variable rpm.

SUMMARY OF THE INVENTION

According to the invention, an AC to AC frequency changer which can be operated wither in the UFC or the CUFC mode of operation is repetitively transferred between these two modes during intervals which are short compared to the duration of a cycle of the input waveform with the proportion of each interval under each mode of operation being selected to produce the desired input power factor. When the frequency changer is operated in each mode for one-half of each interval, the input power factor is unity no matter what the load power factor is. With the disclosed invention, the input power factor can be varied continuously from the load power factor all the way through unity to a power factor of the same magnitude but of opposite sign.

The transfer between operating modes can be accomplished by generating a timing signal which increases in magnitude with time and comparing it to a reference signal representative of the selected input power factor. One of the operating modes is selected at the beginning of each interval and a transfer is made to the other operating mode when the timing and reference signals reach a predetermined relationship, such as being equal.

Where the input waveform is supplied by an AC generator, the invention can be used to regulate the generator voltage. In this embodiment, an error signal generated as the difference between the actual generator voltage and the desired voltage is used to determine the instant during each interval when the transfer between modes is made. Operating in the UFC mode with a lagging load power factor increases the generator voltage by producing a leading input power factor that increases generator excitation. On the other hand, the CUFC mode of operation results in a reduction in generator voltage with a lagging load power factor. When the intervals are determined by comparing a repetitive timing signal which increases in magnitude with time to a fixed reference signal, the error signal is added to a signal equal to one-half of the fixed reference signal and the resultant signal is then compared with the timing signal to effect transfer between modes of operation. When the actual generator voltage is subtracted from the voltage reference signal to generate the error signal, the frequency changer is transferred to UFC operation at the beginning of each interval and transferred to CUFC when the resultant signal is equal in magnitude to the timing signal.

The invention covers apparatus as well as the method for controlling the input power factor of an AC to AC frequency changer. Such apparatus includes first switching control means which effects UFC operation and second switching control means for CUFC operation and means for enabling one switching control means and then the other during the timing intervals.

DESCRIPTION OF THE PREFERRED EMBODIMENTS

Figure 1:
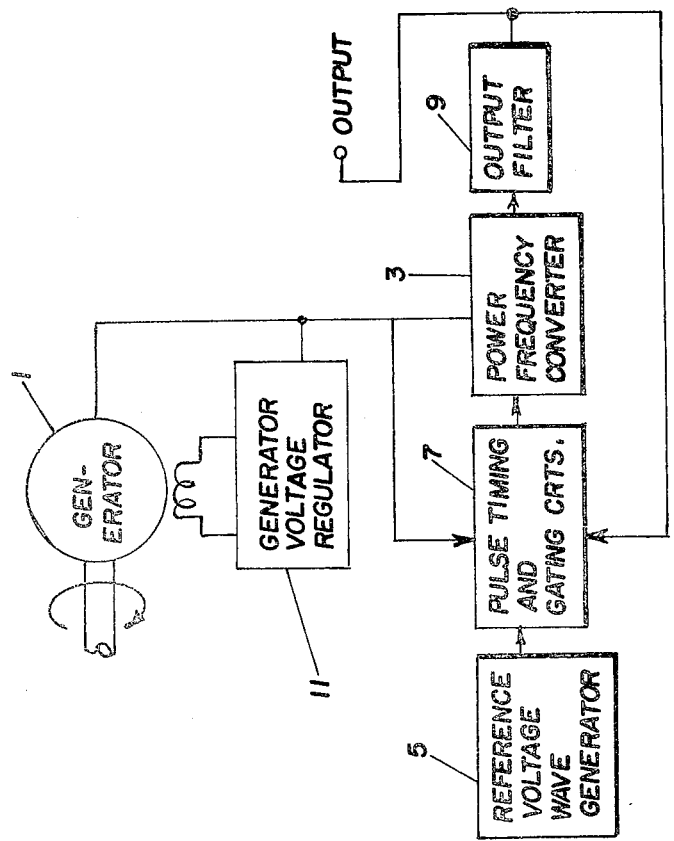
FIG. 1 is a schematic diagram in block diagram form of a frequency changer incorporating the invention.

While the invention is applicable to AC to AC frequency changers wherein the input and output frequencies are both variable, or both constant or wherein one is variable and the other constant, the invention will be described as applied to a variable-speed-constant-frequency (VSCF) converter. Accordingly, FIG. 1 illustrates in block diagram form a VSCF power generating system incorporating the present invention. The generator 1 is a 6 phase AC generator driven by a prime mover, such as an aircraft engine, at variable speed. The 6 phases of generator voltage are each connected to a switch in a power frequency converter 3. A reference voltage wave generator 5, generates a reference waveform at the frequency of the desired output waveform. Pulse timing and gating circuits 7, generate a set of timing waves phase-locked to the generator voltages and sequentially turn on the switches in the power converter 3 at instants determined by a comparison of the reference waveform to the timing waveforms. The sequential operation of the switches in the power converter 3 produces a composite waveform made up of selected segments of each phase of the generator output. This composite waveform is passed through an L-C output filter 9 to produce the converter output having the desired frequency. The frequency of the converter output is exactly equal to that of the reference waveform. The amplitude of the output voltage can be regulated indirectly by controlling the generator voltage through a voltage regulator 11 as shown in FIG. 1. It is also possible to control the amplitude of the output voltage internally in the converter by using, for example, the technique of pulse width modulation which is described in U.S. Pat. No. 3,493,838. It is further possible to control the amplitude of the output voltage by the present invention through a feedback loop to the pulse timing and gating circuits in a manner to be discussed below.

Figure 2:
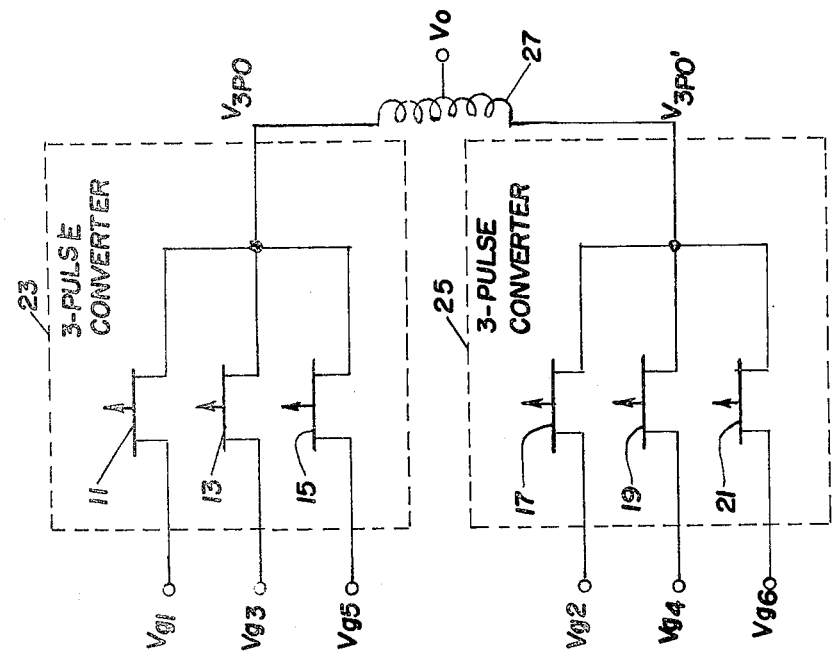
FIG. 2 is a schematic diagram of a 6 pulse converter utilizing bidirectional switches arranged in two three-pulse groups suitable for use in the frequency changer of FIG. 1.

It is common practice to arrange the switches used in the power frequency converter 3 of FIG. 1 in pulse groups. For instance, as shown in FIG. 2, the 6 switches used to switch the 6 input phases $V_{g1}$ through $V_{g6}$ of the converter can be arranged in two 3-pulse groups. In this arrangement, the switches 11, 13 and 15 associated with phases 1, 3 and 5 are operated as one group 23 and switches 17, 19 and 21 associated with phases 2, 4 and 6 are operated as the second group 25. The waveforms generated by each 3-pulse group are combined through an interphase transformer 27 to produce a composite output waveform $V_o$. The arrangement of the switches in pulse groups reduces the switching frequency of the individual switches.

Figure 3:
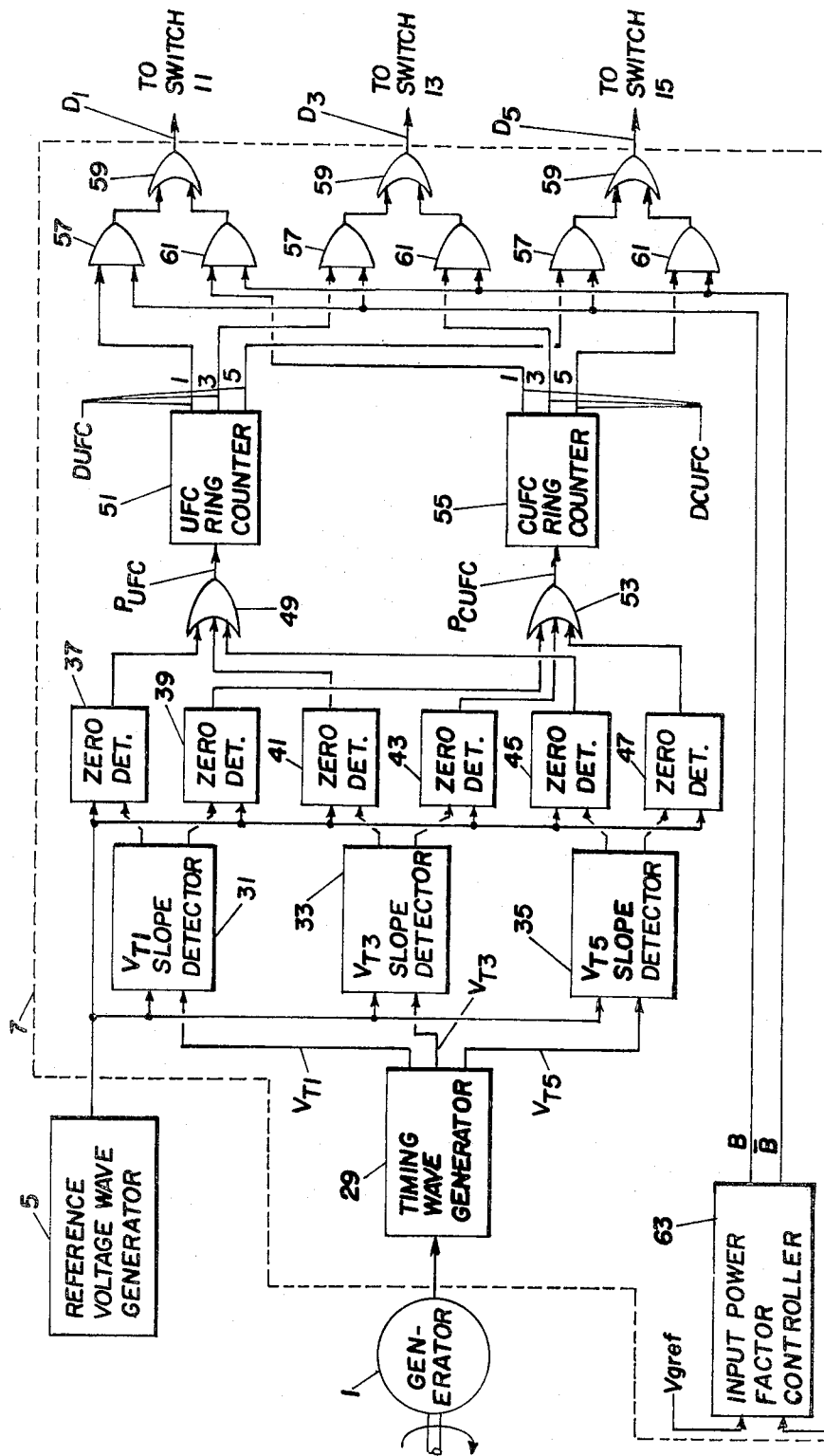
FIG. 3 is a schematic diagram illustrating in greater detail, portions of the frequency changer of FIG. 1.

The switches are shown in FIG. 3 as symmetrical field effect transistors (FETs) with forward and reverse blocking capability. Actually any bidirectional switch of suitable power, frequency, and voltage blocking capability can be used. Thus such switches can also be realized with arrangements of transistors and diodes as for example those shown in FIGS. 4a, b and c of my copending application.

The gating signals for the switches of the power frequency converter 3 are generated by the pulse timing and gating circuits 7 of FIG. 1 in conjunction with the reference voltage wave generator 5. One way of generating the gating signals is to generate a triangular reference waveform and a set of triangular waveform timing signals. A suitable arrangement for gating the switches in this manner is shown in FIG. 3. The pulse timing and gating circuits 7 include a timing wave generator 29 which generates 6 triangular timing waves phase locked to the generator voltages. These signals can easily be generated by techniques well known by those skilled in the art such as by shaping the sinusoidal generator voltages into essentially square waves which are then integrated.

In the interests of clarity, only the remaining portions of the pulse timing and gating circuits 7 associated with the first pulse group 23 are shown in FIG. 3. Each of the timing waves $V_{T1}$, $V_{T3}$ and $V_{T5}$ is applied to a Slope Detector 31, 33 and 35 respectively which compares the slope of the timing wave to that of the reference waveform generated by the Reference Voltage Wave Generator 5. If the slope of the timing wave $V_{T1}$ is opposite in sense to that of the reference waveform, $V_{T1}$ is gated to a Zero Detector 37. If on the other hand, the slope of the reference waveform and the timing waveform are of the same sense, $V_{T1}$ is gated to a second Zero Detector 39. Similarly, the timing waveforms $V_{T3}$ and $V_{T5}$ are gated to either Zero Detectors 41 and 45 or to Zero Detectors 43 and 47 respectively depending upon whether they have a slope which is of the opposite sense or the same sense as the reference waveform.

The Zero Detectors compare the amplitude of the applied timing waveform to that of the reference waveform and when they are equal a pulse is generated. Pulses generated by the Zero Detectors 37, 41 and 45 are applied through an OR element 49 to a three-state UFC Ring Counter 51 while those generated by Zero Detectors 39, 43 and 47 are applied to another three-state CUFC Ring Counter 55 through OR element 53. The ring counter 51 has three outputs each of which is connected to a gate drive circuit for one of the FETs 11, 13 and 15 through an AND element 57 and an OR element 59 to form a first switching control means. In a similar manner, the three outputs of ring counter 55 are each connected to the gate drive circuit for one of the FETs of the group through the OR element 59 and a second AND element 61 to form a second switching control means. An input power factor controller 63, which in at least one embodiment of the invention regulates the voltages generated by the generator 1 indirectly through the frequency changer output voltage $V_o$, supplies a second gating signal B to AND elements 57 and $\overline{B}$ to AND elements 61. The signal B is high to enable the first switching control means when UFC operation is selected by the controller while the signal $\overline{B}$ is high to enable the second switching control means when CUFC operation is selected. Thus, under UFC operation, the switches 11, 13 and 15 are controlled by the UFC Ring Counter 51 which sequentially turns these switches on one at a time as the counter is pulsed. On the other hand, sequential operation of these switches is controlled by the CUFC Ring Counter 55 when the controller selects CUFC operation and $\overline{B}$ is high.

Figure 4:
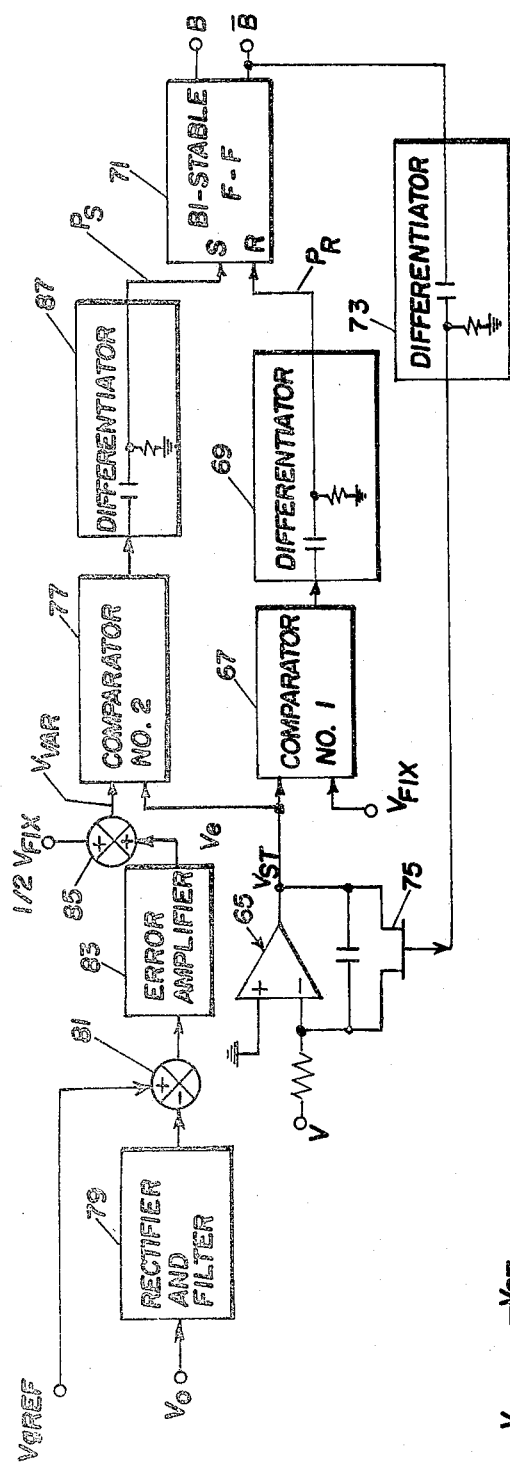
FIG. 4 is a schematic diagram of an input power factor controller suitable for use in the circuit of FIG. 3.

FIG. 4 illustrates a suitable configuration for the Input Power Factor Controller 63 in FIG. 3 which is effective to control the amplitude of the converter output voltage. An integrator 65 generates a ramp waveform which is applied to a first comparator 67 where it is compared to a fixed reference voltage $V_{FIX}$. The output of the comparator 67 pulses, through a differentiator 69, the Reset input of Bistable Flip-Flop 71. When the ramp signal becomes equal to $V_{FIX}$, the pulse applied to the flip-flop 71 causes the B output signal to go high. At the same time the $\overline{B}$ output goes low to turn on, through differentiator 73, the analog switch 75 shunting the capacitor of the integrator 65. This resets the integrator each time B goes high so that the effective output of the integrator is a sawtooth waveform.

The sawtooth waveform generated by the integrator 65 is also applied to a second comparator 77. The second input for comparator 77 is generated by converting the actual generator voltage, as indirectly represented by the frequency changer output voltage $V_o$, into a DC signal in Rectifier and Filter 79, and subtracting this DC signal at summing point 81 from a signal $V_{gref}$, representative of the desired generator voltage, to create an error signal. The error signal is amplified in Error Amplifier 83 and added to a signal equal to one-half $V_{FIX}$ at summing point 85 with the resultant signal serving as the second input to the second comparator 77. When this resultant signal is equal in amplitude to the sawtooth waveform, comparator 77 applies a pulse, through Differentiator 87, to the Set-Input of Bi-Stable Flip-Flop 71. This in turn causes the B output of the flip-flop to go high and the B output to go low. Of course, if desired, the actual generator voltage can be controlled more directly by applying the generator voltage directly to Rectifier and Filter 79 instead of using the frequency changer output voltage $V_o$.

Figure 5:
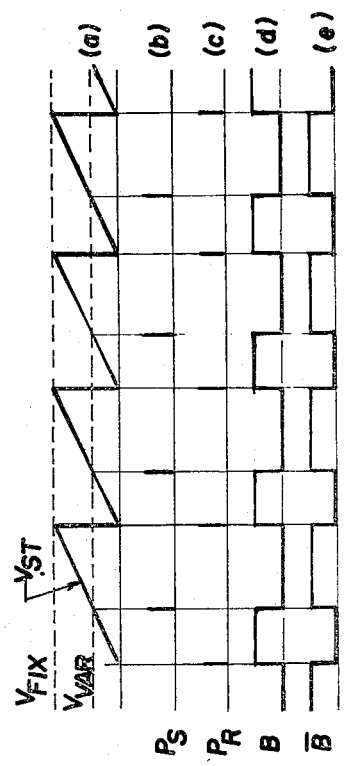
FIGS. 5 (a) through (d) are waveform diagrams illustrating the operation of the input power factor controller of FIG. 4.

FIG. 5 illustrates graphically the operation of the Input Power Factor Controller shown in FIG. 4. Waveform 5(a) shows the relationship between the timing waveform $V_{ST}$ generated by the integrator, $V_{FIX}$, the reference voltage applied to comparator 67 and, $V_{VAR}$, which is the resultant of the sum of the generator error voltage and a bias voltage equal to one-half $V_{FIX}$. Waveform 5(b) shows that a set pulse $P_S$ is applied to flip-flop 71 each time $V_{ST}$ becomes equal to $V_{VAR}$ while 5(c) shows that a reset pulse is generated each time $V_{ST}$ becomes equal to $V_{FIX}$. Waveforms 5(d) and (e) illustrate respectively that each reset pulse $P_R$ sets the B output of the flip-flop high while the set pulses, $P_S$, make $\overline{B}$ go high. Thus the Input Power Factor Controller generates a timing interval equal in duration to the time required for the timing signal, $V_{ST}$, to become equal to $V_{FIX}$. Each time this occurs, i.e. at the beginning of each interval, the B output signal goes high. At a point during the timing interval dependent upon the magnitude of the generator voltage error signal, the output signal $\overline{B}$ goes high. It can be appreciated, that if the voltage error signal is equal to zero, transfer from the B output being high to $\overline{B}$ high will occur at the midpoint of the interval and thus B will be high for the first half of each interval and $\overline{B}$ will be high for the second half.

Figure 6:
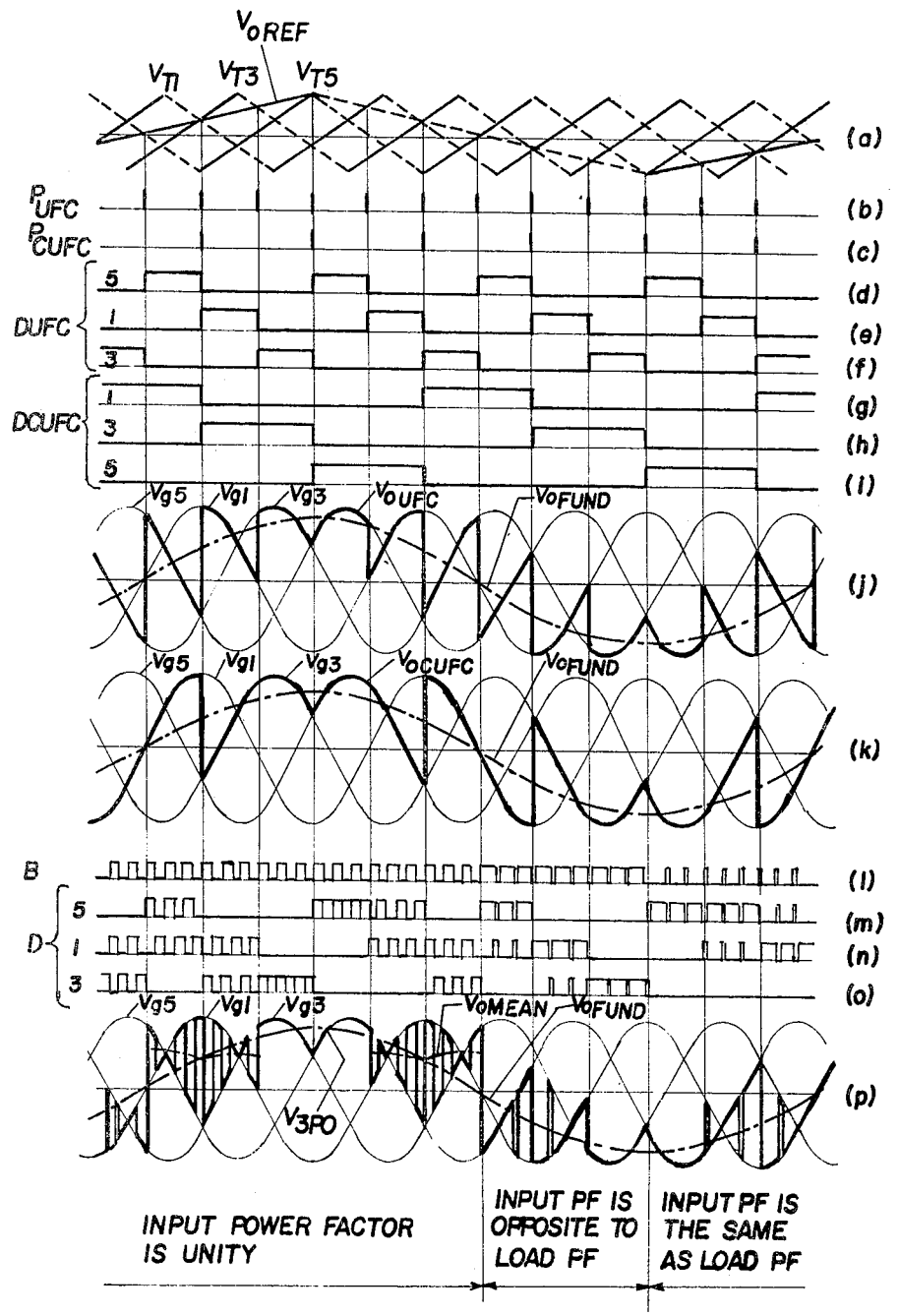
FIGS. 6 (a) through (o) are waveform diagrams illustrating the overall operation of the frequency changer disclosed in FIGS. 1 through 4.

FIG. 6 is a waveform diagram which illustrates the overall operation of the disclosed frequency changer. Waveform 6(a) shows triangular reference waveform $V_{OREF}$ generated by the Reference Voltage Wave Generator 5 and the triangular timing waveforms $V_{T1}$, $V_{T3}$ and $V_{T5}$ produced by Timing Wave Generator 29. The negative slopes of the waveforms are shown in dashed lines for clarity only. Waveform 6(b) illustrates the pulse train $P_{UFC}$ applied to the UFC Ring Counter 51. These pulses occur at instants when the output reference waveform $V_{OREF}$ is equal in amplitude to but has a slope opposite to that of a timing waveform. Similarly waveform 6(c) illustrates that the pulses of pulse train $P_{CUFC}$ applied to CUFC Ring Counter 55 are generated at instants when the output reference voltage is equal in magnitude to and has a slope of the same sense as a timing waveform. Waveforms 6(d) through (f) illustrate the states of the drive signals DUFC generated by UFC Ring Counter 51 while waveforms 6(g) through (i) illustrate similar signals for the CUFC Ring Counter (55).

Waveform 6(j) illustrates the three-pulse, unfiltered output waveform $V_{OUFC}$ that would be generated by the three-pulse group during UFC operation without the use of the input power factor control of the present invention. Portions of the generator phase voltages $V_{g1}$, $V_{g3}$ and $V_{g5}$ are switched to the output in accordance with the pattern of drive signals DUFC shown in FIGS. 6(d) through (f). Waveform 6(j) also shows in dash-dot line the fundamental component $V_{OFUND}$, of the output voltage waveform $V_o$. As will be noticed from these waveforms, during UFC operation, the frequency changer switches sequentially to input phases which are more positive while the fundamental component of the output waveform is positive going and to input phases which are more negative while it is negative going.

CUFC operation without power factor control is illustrated in waveform 6(k). In this mode of operation, the frequency changer switches to input phases which are more negative while the fundamental of the output voltage waveform is positive going and to more positive input phases while it is negative going in accordance with the pattern of drive signals $D_{CUFC}$ illustrated in waveforms 6(g) through (i).

The waveform B generated by the Input Power Factor Controller of FIG. 4 is illustrated by waveform 6(l). As can be seen, the frequency of this waveform is higher than that of the generator so that the intervals discussed in connection with FIG. 5 are shorter in duration than a half-cycle of the lowest generator frequency. Three selected power factor conditions are illustrated in waveform 6(l) and the remaining waveforms of FIG. 6. In the left half of these waveforms, the input power factor of the frequency changer is unity, to the right of center the power factor is opposite the load power factor and on the far right it is the same as the load power factor. On the left side of the figure, where the power factor is unity, the B signal is alternately high for one-half the time and low the other half. The B signal, which is not shown in FIG. 6, is of course the complement of B and would be high at the times that B was low. With the B and $\overline{B}$ signals superimposed on the DUFC and DCUFC signals shown in waveforms 6(d) through (i), the resultant drive signals $D_1$, $D_3$ and $D_5$ generated at the outputs of OR elements 59 in FIG. 3 appear as in waveforms 6(m) through (o). These pulsating drive signals applied to the bidirectional switches 11, 13 and 15 produce the three-pulse, unfiltered output waveform $V_{3PO}$ shown in waveform 6(p). As illustrated, the frequency changer transfers at a rate which is rapid compared to the generator phase frequencies, between the input phase selected for UFC operation and that selected for CUFC operation. When it is desired that the input power factor be opposite that of the load power factor the frequency changer remains longer and the UFC mode operation and if it desired that the input power factor be the same as the load power factor, it remains longer in CUFC operation. The power factor may be continuously adjusted between the load power factor through unity to the opposite power factor by adjustment of the relative portion of the timing intervals that the frequency changer remains in the UFC or CUFC mode of operation. Since the UFC mode of operation tends to increase generator excitation and thereby increase generator voltage and the CUFC mode decreases generator voltage with a lagging load power factor, the present invention when used in the configuration discussed in detail above, serves to regulate generator voltage. It should also be understood that where it is desired to control the input power factor per se and not to directly regulate the generator voltage, one of the other means discussed above for regulating generator voltage can be used, and an independent input power factor reference signal can be compared with the sawtooth timing waveform in comparator 77 in FIG. 4.

Other arrangements of course may be used to generate the switching sequences for UFC and CUFC operation and a multiphase output waveform can be generated by using the drive signals $D_1$, $D_2$ and $D_3$ to switch the appropriately phased segments of the generator voltages to multiple output lines as taught in my co-pending application. It will be appreciated by those skilled in the art that various other modifications and alternatives to the details specifically described herein could be developed in light of the overall teachings of the disclosure and that the principals illustrated could be applied to other AC to AC power converters besides the VSCF. Accordingly, the particular arrangements disclosed are meant to be illustrative only and not limiting as to the scope of the invention which is to be given the full breadth of the appended claims and any and all equivalents thereof.

I claim:

1. A method for controlling the input power factor when synthesizing on an output line an output voltage waveform of one frequency from a multiphase input voltage waveform of another frequency, said method comprising the steps of:
   operating in a first mode in which the power factor of the input waveform is opposite to the power factor in the output waveform by sequentially switching to the output line, segments of each phase of the multiphase input voltage waveform which are more positive while the fundamental component of the output voltage waveform is positive going and segments which are more negative while the output voltage waveform is negative going;
   operating in a second mode in which the input power factor is the same as that of the output waveform by sequentially switching to the output line segments of each phase of the multiphase input voltage waveform which are more negative while the fundamental component of the output voltage waveform is positive going and segments which are more positive while the output voltage waveform is negative going; and
   transferring between said first and second operating modes during intervals which recur at a frequency which is higher than the frequency of the input waveform with the relative proportion of operation in each mode during said intervals being selected to produce the desired input power factor.

2. The method of claim 1 wherein each mode of operation is selected for one-half of the duration of each interval such that the power factor of the input waveform is unity no matter what the output power factor is.

3. The method of claim 1 wherein the step of transferring between operating modes includes the steps of:
   generating a timing signal which increases in magnitude with time during each interval,
   generating a reference signal having a magnitude representative of the selected input power factor,
   transferring to one of said operating modes at the beginning of each interval,
   comparing the reference signal to said timing signal during each interval, and
   transferring to the other operating mode when the reference signal has a predetermined relationship to the timing signal.

4. The method of claim 4 wherein said timing signal is reset at the beginning of each interval and wherein the transfer is made to the other operating mode when the reference signal equals the timing signal.

5. The method of claim 1 wherein the input waveform is suppplied by an AC generator and the voltage of the generator is regulated by providing that the step of transferring between operating modes includes the steps of:
   transferring to one of said modes of operation at the beginning of each of said intervals,
   generating a voltage reference signal representative of the desired generator voltage,
   generating an error signal as the difference between the voltage reference signal and the actual generator voltage and
   transferring to the other mode of operation during each interval at an instant which is determined as a function of said error signal.

6. The method of claim 5 wherein the step of transferring to said one mode at the beginning of each interval includes the steps of:
   generating a timing signal that increases with time from a preset level during each interval;
   generating a fixed reference signal, and
   comparing the timing signal with the fixed reference signal and transferring to said one operating mode when they are equal, said interval being thus defined by the length of time required for the timing signal to become equal to the fixed reference signal, and wherein transferring to said other mode of operation includes the steps of:
   adding the error signal to one-half of said fixed reference signal to generate a resultant signal, and
   comparing the resultant signal with the timing signal and transferring to said other operating mode when they are equal.

7. The method of claim 6 wherein the actual generator voltage is subtracted from the voltage reference signal to generate the error signal, wherein the output waveform has a lagging power factor, and wherein the one operating mode is the first operating mode and the other operating mode is the second.

8. The method of claim 1, 2, 3 or 5 wherein said one frequency is a preselected constant frequency and wherein said another frequency is variable.

9. A frequency changer for generating on an output line an output waveform of one frequency, from a multiphase input waveform of another frequency, and for controlling the power factor of the input waveform, said frequency changer comprising:

a bidirectional switch connected between each phase of a multiphase input waveform and the output line, a timing wave generator for generating a set of timing waveforms phase locked to each phase of the input waveform, a reference waveform generator for generating a reference waveform having a frequency equal to that of the fundamental component of the output waveform, first switching control means which when enabled turn on the bidirectional switches sequentially one at a time at instants when the reference waveform is equal in amplitude but opposite in slope to one of the timing waveforms such that the power factor of the input waveform is opposite to that of the output waveform generated thereby;

second switching control means which when enabled turn on the bidirectional switches sequentially one at a time at instants when the reference waveform is equal in amplitude to, and has a slope of the same sense as, each of the timing waveforms, such that the power factor of the input waveform is the same as that of the output waveform generated thereby;

means for repetitively generating timing intervals having a frequency which is higher than the frequency of the input waveform; and means for enabling one switching control means and then the other during each interval, with the relative proportion of each interval in which each switching control is enabled being selected to provide the selected input power factor.

10. The frequency changer of claim 9 wherein said enabling means includes means for enabling said one switching control means at the beginning of each interval, and for enabling the other switching control means at an instant during the interval which produces over the interval an average input power factor equal to the desired value.

11. The frequency changer of claim 10 wherein said enabling means includes means to enable said one switching control means during one-half of each timing interval and for enabling the other switching control means during the other half of the interval such that the input power factor is unity regardless of the output waveform power factor.

12. The frequency changer of claim 9 wherein said timing interval generating means includes means for generating a fixed reference signal, means for generating a repetitive timing signal which varies in amplitude with time, comparator means for comparing said timing signal to said fixed reference signal and for generating an interval signal each time the timing signal equals the fixed reference signal, and wherein said enabling means includes means responsive to said interval signal to enable said one switching control means, means for generating a power factor reference signal representative of a desired input power factor and means for comparing said power factor reference signal to said timing signal and for enabling said other switching control means when they are equal.

13. The frequency changer of claim 12 wherein said input waveform is supplied by a generator and wherein said means for generating said power factor reference signal includes means for generating a voltage reference signal representative of the desired voltage of the generator, means for generating an error signal as the difference between the voltage reference signal and the actual generator voltage, and means for summing the error signal with a signal equal to one-half of the fixed reference signal to generate the power factor reference signal, such that the input power factor is adjusted to generate the desired generator voltage.

14. The frequency changer of claim 9, 11, 12 or 13 wherein said one frequency is a preselected constant frequency and wherein said another frequency is variable.

* * * * *